(12) United States Patent
Bernard et al.

(10) Patent No.: US 6,780,274 B2
(45) Date of Patent: Aug. 24, 2004

(54) FABRICATION OF COLLIMATORS EMPLOYING OPTICAL FIBERS FUSION-SPLICED TO OPTICAL ELEMENTS OF SUBSTANTIALLY LARGER CROSS-SECTION AREAS

(75) Inventors: Pierre Bernard, Des Bosquets (CA); Mark A. Fitch, Alguquerque, NM (US); Paul Fournier, Albuquerque, NM (US); Marc Farrell Harris, Tijeras, NM (US); William P. Walters, Peralta, NM (US)

(73) Assignee: Lightpath Technologies, Inc., Orlando, FL (US)

( * ) Notice: Subject to any disclaimer, the term of this patent is extended or adjusted under 35 U.S.C. 154(b) by 268 days.

(21) Appl. No.: 10/013,642

(22) Filed: Nov. 13, 2001

(65) Prior Publication Data

US 2002/0054735 A1 May 9, 2002

Related U.S. Application Data (60) Division of application No. 10/012,091, filed on Mar. 7, 2000, which is a division of application No. 09/450,473, filed on Nov. 29, 1999, now Pat. No. 6,360,039, which is a continuation-in-part of application No. 09/450,472, filed on Nov. 29, 1999, now Pat. No. 6,352,376, which is a continuation-in-part of application No. 09/450,471, filed on Nov. 29, 1999, now Pat. No. 6,217,698, which is a continuation-in-part of application No. 09/118,033, filed on Jul. 17, 1998, now Pat. No. 6,033,515.

(51) Int. Cl.[7] .............................................. B32B 31/00
(52) U.S. Cl. .............................. 156/272.8; 156/273.3; 156/304.6; 219/121.63; 65/406; 359/652; 385/33; 385/34; 385/51; 385/96
(58) Field of Search ............................. 156/158, 272.8, 156/273.3, 304.6, 309.9; 219/121.63, 121.64; 385/51, 33, 34, 95, 96, 97, 98, 124; 65/406, 407; 359/652, 653, 654

(56) References Cited

U.S. PATENT DOCUMENTS

| 4,737,006 A | 4/1988 | Warbrick ................. 350/96.18 |
| 4,962,988 A | 10/1990 | Swann ........................ 385/34 |
| 5,299,274 A | 3/1994 | Wysocki et al. .............. 385/96 |
| 5,745,344 A | 4/1998 | Fukuoka et al. .............. 385/95 |
| 6,336,749 B1 * | 1/2002 | O'Toole et al. ............... 385/96 |

FOREIGN PATENT DOCUMENTS

| GB | 1489710 A | * 10/1977 | ........... C03B/37/02 |

OTHER PUBLICATIONS

L. Rivoallan et al, "Fusion Splicing Of Fluoride Glass Optical Fibre With $CO_2$ Laser", *Electronics Letters*, vol. 24, No. 12, Jun. 9, 1988, pp 756–757.

N. Shimizu et al, "Fusion Splicing Between Optical Circuits And Optical Fibres", *Electronics Letters*, vol. 19, No. 3, Feb. 3, 1983, pp 96–97.

(List continued on next page.)

*Primary Examiner*—Jeff H. Aftergut
*Assistant Examiner*—John L. Goff (57) ABSTRACT

A fiber collimator is provided, comprising at least two optical components, one of the optical components (e.g., an optical element such as a collimating lens or a plano-plano pellet) having a surface that has a comparatively larger cross-sectional area than the surface of the other optical component(s) (e.g., at least one optical fiber). The optical components are joined together by fusion-splicing, using a laser. A gradient in the index of refraction is provided in at least that portion of the surface of the optical element to which the optical fiber(s) is fusion-spliced or at the tip of the optical fiber. The gradient is either formed prior to or during the fusion-splicing. Back-reflection is minimized, pointing accuracy is improved, and power handling ability is increased.

22 Claims, 5 Drawing Sheets

OTHER PUBLICATIONS

L. Rivoallan et al, "Monomode Fibre Fusion Splicing With $CO_2$ Laser", *Electronics Letters*, vol. 19, No. 2, Jan. 20, 1983, pp 54–55.

H. Uetsuka et al, "Unique Optical Bidirectional Module Using A Guided–Wave Multiplexer/Demultiplexer", *Technical Digest*, OFC'93, pp 248–249.

T. Shiota et al, "Improved Optical Coupling Between Silica–Based Waveguides And Optical Fibers", *Technical Digest*, OFC'94, pp 282–283.

* cited by examiner

FABRICATION OF COLLIMATORS EMPLOYING OPTICAL FIBERS FUSION-SPLICED TO OPTICAL ELEMENTS OF SUBSTANTIALLY LARGER CROSS-SECTION AREAS

CROSS-REFERENCE TO RELATED APPLICATION

The present application is a divisional application of application Ser. No. 09/450,473, filed Nov. 29, 1999, now U.S. Pat. No. 6,360,039, issued Mar. 19, 2002, which in turn is a continuation-in-part of application Ser. No. 09/118,033, filed Jul. 17, 1998, now U.S. Pat. No. 6,033,515, issued Mar. 7, 2000, and is related (1) to application Ser. No. 09/450,471, filed Nov. 29, 1999, now U.S. Pat. No. 6,217,698, issued Apr. 17. 2001, which is also a continuation-in-part application of the '033 application, and (2) to application Ser. No. 09/450,472, filed Nov. 29, 1999, now U.S. Pat. No. 6,352, 376, issued Mar. 5, 2002, which is a divisional application of the '033 application. The present application is also related to application Ser. No. 10/012,091, filed on even date herewith, which is a divisional application of U.S. Pat. No. 6,360,039.

TECHNICAL FIELD

The present invention relates generally to optoelectronics involving optical components of significantly different cross-sectional areas, such as optical fibers joined to optical elements such as lenses, filters, gratings, prisms, and the like, and, more particularly, to fiber collimators.

BACKGROUND ART

Fiber collimators find extensive use in optoelectronics, particularly in the coupling of light from (to) an optical fiber to (from) a collimating lens. Fiber collimators are basic components of telecommunication products such as isolators, mechanical switches, couplers, circulators, optical switches, and wavelength division multiplexers. Such fiber collimators are fabricated by joining an optical fiber to an optical element.

While splicing of one optical fiber to another or of one optical fiber to an optical waveguide is known, the sizes are similar and localized heating can be used to fusion-splice the optical components together. Splicing an optical fiber to a much larger optical element is more challenging. For example, U.S. Pat. No. 4,737,006 entitled "Optical Fiber Termination Including Pure Silica Lens And Method Of Making Same", issued to K. J. Warbrick on Apr. 12, 1988, discloses fusion-splicing an undoped (pure) silica rod to a single mode fiber to fabricate a collimator, employing an electric arc. However, this is an extremely complicated method and has limited applications.

The most often utilized processes for attaching optical fibers to the larger optical elements include (1) bonding the fiber faces directly to the optical element with adhesives or (2) engineering a complex mechanical housing which provides stable positioning of air-spaced fibers and optical elements throughout large changes in environmental conditions.

The use of adhesives in the optical path of such devices is undesirable due to the chance of degradation of the adhesive over time. On the other hand, spacing the fibers a fixed distance away from the optical elements by utilizing complex mechanical housings requires the use of anti-reflection coatings at all air-glass interfaces in order to minimize losses of optical energy through the device. The presence of air-glass interfaces also provides a source of back-reflected light into the optical fibers. This phenomenon, known as back-reflection, is a source of noise in many communications networks, and effectively limits transmission bandwidth of such communications networks.

The parent application to the present application provides a simple process for fusion-splicing two optical components of different sizes together, e.g., fusion-splicing an optical fiber to a much larger (at least 2×diameter) optical element, using laser heating.

While butt-end coupling of the optical fiber to an optical element is desired for simplicity, in fact, the prior art requires angle-cleaving of the optical fiber and angle-polishing of the optical element to reduce or minimize back-reflection. That is to say, the optical fiber and optical element are both processed to provide coupling at a non-perpendicular angle to the optic axis, which is parallel to the optical fiber. Back-reflection resulting from simple butt-end coupling reduces the optical output and efficiency. In optical communication systems, back-reflection also has a detrimental impact on the BER (bit error rate) and the SNR (signal-to-noise ratio). Due to its uncontrolled generation and propagation, power reflected back in the fiber is considered excess noise when detected.

In previous art, it has been shown that positioning an angle-cleaved fiber or angle-polished fiber in proximity to the angle-polished face of a collimating lens results in excellent collimation and excellent performance characteristics of fiber collimators. However, these existing technologies for assembling collimators require very labor intensive active alignment techniques. The alignment techniques include manipulating the position of the fiber relative to the lens in three linear axes and three rotational axes during final assembly. If a collimator can be built that effectively makes the fiber and the lens a single piece, then alignment can be reduced to two linear and two rotational axes during the fusion process and there is no need for alignment during final assembly, thereby reducing costs dramatically.

A key performance parameter to be minimized in collimator assemblies is back reflection of light down the fiber. By butt-coupling or fusion-splicing a fiber to a lens of the same refractive index, there is no apparent interface to cause back reflection. The beam is then allowed to diverge in the lens and does not see an index break surface until it exits the lens. By then, the beam is so large that the amount of light that can return to the fiber core is extremely small.

The laser fusion-splicing method disclosed and claimed in the parent application to the present application provides a back-reflection of −57 dB. This may be acceptable for some applications. However, a further reduction in back-reflection would be desirable for other applications.

DISCLOSURE OF INVENTION

In accordance with the present invention, a fiber collimator is provided, having reduced back-reflection, improved pointing accuracy, and improved power handling characteristics. The fiber collimator comprises at least one optical fiber fusion-spliced to an optical element, such as a collimator lens. The optical element is constructed from an optical material which has an index of refraction nearly equal to the index of refraction of the optical fiber to which it is fusion-spliced. For commercial reasons, pure fused silica glass is preferred. In addition, the fiber collimator may comprise at least one fiber fusion-spliced to an optical element other than a collimator lens, such as a plano-plano "pellet" which is subsequently assembled jointly with a separate collimator lens. This latter configuration is especially useful in creating collimators with long optical path lengths and associated large collimated beam diameters. The utilization of an optical pellet provides all the advantages of reduced back-reflection and improved power handling while reducing the required lens thickness in long focal length collimators.

The splice created by the laser fusion-splice process will typically have back-reflection of −57 dB. This slight residual back-reflection is due to the small refractive index difference between the fiber core and pure fused silica. Even lower back-reflection can be achieved by creating a thin axial gradient layer at the splice junction. Simple adjustment of the fusion-splice process parameters is enough to favor the creation of such an axial gradient through the diffusion of the dopant in the fiber core. The resulting back-reflection can be less than −65 dB with no detrimental effect on the quality of the splice. Similar results can be obtained with a prior doping of a thin surface layer on the optical element to be fused.

By attaching fibers directly to other optical components without using epoxies or special termination techniques, costs are reduced, environmental stability is improved, alignment accuracy is enhanced, pointing accuracy is improved, and power handling is significantly increased.

Other objects, features, and advantages of the present invention will become apparent upon consideration of the following detailed description and accompanying drawings, in which like reference designations represent like features throughout the FIGURES.

BRIEF DESCRIPTION OF THE DRAWINGS

The drawings referred to in this description should be understood as not being drawn to scale except if specifically noted.

BEST MODES FOR CARRYING OUT THE INVENTION

Reference is now made in detail to a specific embodiment of the present invention, which illustrates the best mode presently contemplated by the inventors for practicing the invention. Alternative embodiments are also briefly described as applicable.

Figure 1A:
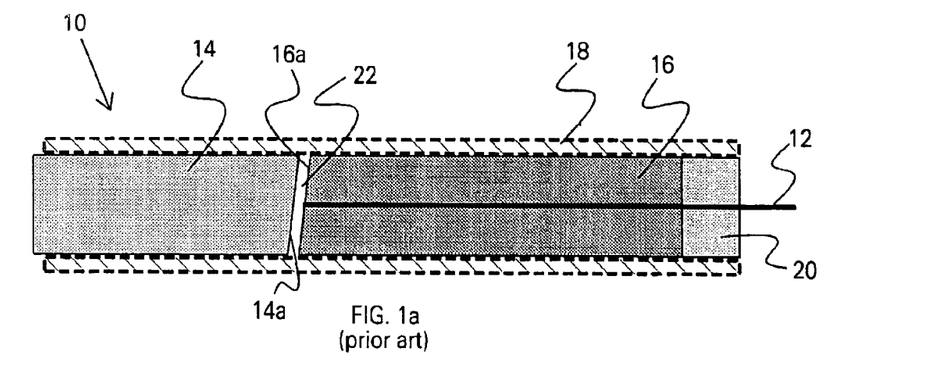
FIG. 1a is a side elevational view of a prior art fiber collimator.

A prior art fiber collimator 10 is depicted in FIG. 1a, comprising an optical fiber 12 optically connected to a lens 14. The optical fiber 12 is maintained in position by a glass or ceramic ferrule 16. The lens 14 and ferrule 16 with its optical fiber 12 are secured in a mounting sleeve 18. A strain-relief elastomer 20 is provided at the end of the mounting sleeve 18 from which the optical fiber 12 emerges. The lens 14 and ferrule 16 are provided with surfaces 14a, 16a, respectively, that are at a non-normal angle to the fiber 12. The fiber 12 is spaced from the lens 14 by an air gap 22.

Figure 1B:
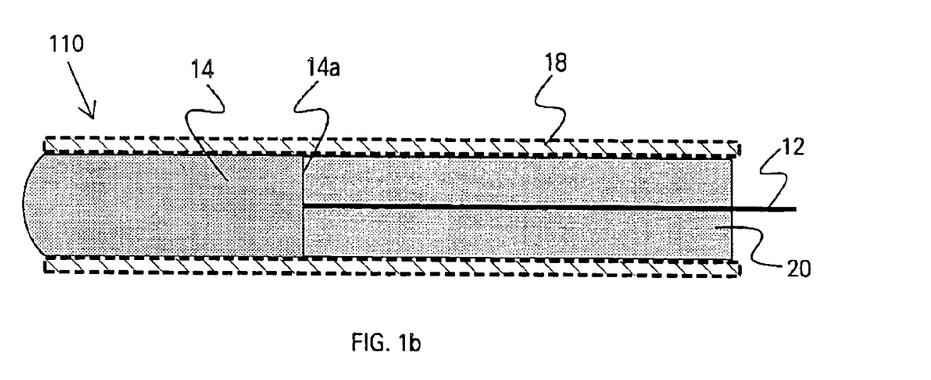
FIG. 1b is a side elevational view of one embodiment of the fiber collimator of the present invention.

For comparison, the fiber collimator 110 of the present invention is depicted in FIG. 1b. It will be noted that there is essentially no air gap; the fiber 12 is coupled directly to the lens 14 by the fusion process described below. Further, there is no angle of the lens surface 14a with respect to the fiber 14; the lens surface is normal to the fiber. As a result, back-reflection is considerably reduced and pointing accuracy is improved. Further, as a consequence of the process disclosed herein, power handling capability is considerably enhanced. The reduction in back-reflection, improvement in pointing accuracy, and increase in power handling capability are all discussed in greater detail below.

Localized heat has been effectively used in a variety of glass processing operations including surface polishing, fiber drawing, and fusion-splicing. The heat source used is frequently a simple resistance heater or a controlled arc. All of the aforementioned processes can also be performed using a laser as a heat source.

Prior to the present invention, however, a method for splicing optical components of substantially different cross-sectional areas had not been developed, to the knowledge of the inventors. The present invention is directed to a method to form seamlessly fused monolithic pieces.

To fuse one or more optical components of a first cross-sectional area to an optical component of a substantially larger cross-sectional area, in one embodiment, the larger surface is first pre-heated by the laser. The pre-heat temperature is just sufficient to polish and melt the surface of the larger component at the location one desires to fuse the smaller component. Depending upon the size, it may be a heating of the entire surface or only a localized heating. The first surface(s) are then brought into contact with the pre-heated surface and, once the thermal exchange is established (by conduction of heat), all components are heated simultaneously. If all surfaces are large (large with respect to the localized heating zone), then all may need preheating. Once the surfaces are in contact at the appropriate elevated temperatures, fusion occurs. The fusion temperature is just enough above the softening temperature to ensure a good flow of thermal energy between the two components.

In a second embodiment, the fusion occurs starting with contact of all of the optical components and the components are never separated during the fusion-splicing.

In a third embodiment, all of the optical components are brought into contact, then pulled back after alignment, and then fusion-spliced as in the first embodiment.

Qualification of the interface is accomplished by measuring the back reflection of light through the system as well as mechanical testing.

There are no practical limitations in using this technique with respect to size mismatch, or the absence of a mismatch, or in cross-sectional geometry.

Any multiple pieces of optical elements, whether comprising an inorganic glass or an organic polymer, can be fused using the method of the present invention. The most common application will be fusion of single mode fibers to optoelectronic or telecommunications devices. Fusion-splicing in accordance with the teachings herein virtually eliminates back-reflection and the associated losses. It is also very cost-effective, with a splice requiring a few seconds or less and the process can be fully automated. Splicing eliminates the need for active alignment in many instances. Splicing also ablates contaminants and precludes the need for foreign materials, such as adhesives and other organic materials, in the optical path.

Optical inorganic glasses, such as silicas, silicates, borosilicates, borates, phosphates, aluminates, chalcogenides and chalco-halides, halides, etc., and optical organic polymers, such as acrylates, methacrylates, vinyl acetates, acrylonitriles, styrenes, etc., may be beneficially employed in the practice of the present invention, although the invention is not limited to the specific classes of materials listed.

Because the heating is quick and localized, components can be anti-reflection-coated on surfaces other than the surface to be fused prior to fusion. The process of the present invention also minimizes the number of coated surfaces. Typical assembly techniques leave a minimum number of surfaces to be coated: the face of each optical fiber being spliced and both the input and output faces of the lens. However, the process of the present invention leaves as few as one surface because several surfaces (each optical fiber face and the lens input face) are combined into a monolithic fused piece. Every surface, even when coated, contributes losses to the system because there is no perfect antireflection coating. Thus, reducing the number of surfaces to be coated reduces losses to the system. Furthermore, for conventional collimators, the coating used at the tip of the fiber considerably limits the power handling ability of these elements. The method of the present invention eliminates the coating at the fiber tip and, in fact, eliminates the fiber-air junction all together. Collimators fabricated in this fashion can handle considerably more power (>10x) than other types of collimators.

Pointing accuracy and beam quality can be monitored prior to fusion and locked in due to fusion. Conventional prior art) collimators have an intrinsic pointing error (the beam coming out of the collimator propagates along a line which is at an angle of approximately 0.5° with the axis of the collimator). This error arises from the angle-polished surfaces and the associated air gap. In the present invention, when configured with only one fiber, the collimator exhibits symmetry about the axis defined by the fiber, and the pointing error can be reduced to values smaller than 0.1°. Such a small pointing error is a considerable advantage for subsequent use of these collimators in devices because the optical alignment becomes faster and simpler.

Elimination of angled surface index breaks reduces polarization effects such as polarization-dependent losses (PDL) and polarization mode dispersion (PMD) in fabricated components. Current methods employ optical surfaces which are angled relative to the optical axis in order to control back reflection, thereby inducing PDL and PMD above those inherent in the materials.

Another distinct advantage of the present invention is the thermal stability of the system. Because the parts are seamlessly fused into a monolithic piece, there is no dependence on the housing for maintaining sub-micron spacing tolerances as there is with other prior art approaches in optoelectronic and telecommunications devices.

The present invention makes possible a very high quality and low cost product for the optoelectronics/telecommunications industry. Without this technology, one would be forced to use the prior art techniques known in the telecommunications industry, which are very costly, cannot perform as well, and/or use undesirable materials in the optical path.

The method of the present invention for splicing one or more small cross-sectional area optical fibers to a larger cross-sectional area optical element comprises:

1. aligning the optical fiber(s) and the optical element along an axis;
2. turning on a directional laser heat source (such as an infrared laser) to form a laser beam;
3. directing the laser beam to be collinear with the fiber(s) (this way, most of the laser light is not absorbed by the small fiber(s) but is reflected off surface because the reflection coefficient is very high at grazing incidence);
4. ensuring that the laser beam strikes the larger cross-sectional area optical element at normal or near normal incidence so that absorption of the laser is much more efficient on the larger surface;
5. adjusting the laser power level to reach a temperature equal to or higher than the softening temperature on the surface of the element to achieve fusion-splicing (and simultaneously achieve polishing and contamination ablation); and
6. turning off the laser.

In the first embodiment, the two components (e.g., optical fiber(s) and optical element) are aligned but separated by a space (typically a few millimeters), the laser beam is turned on to form the softening region, and the surface of the optical fiber(s) is brought in contact with the softening region of the optical element, the contact resulting in heat transfer to the surface of the optical fiber(s), which then softens, thereby achieving the fusion-splicing.

In the second embodiment, the two components (e.g., optical fiber(s) and optical element) are first brought into contact and the laser beam is then turned on to form the softening region where the two components are in contact to achieve the fusion-splicing.

In the third embodiment, the two components (e.g., optical fiber(s) and optical element) are aligned, then brought into contact, then separated by a space (typically a few millimeters), the laser beam is turned on to form the softening region, and the surface of the optical fiber(s) is brought in contact with the softening region of the optical element, the contact resulting in heat transfer to the surface of the optical fibers, which then softens, thereby achieving the fusion-splicing.

For fusion-splicing typical inorganic glasses, such as silica, a $CO_2$ laser, which operates in the range 9 to 11 µm, is preferred, since silica-based glasses have very large absorption coefficient. Other optical materials typically have a large absorption in the infrared, and accordingly, lasers operating in another region of the IR spectrum may be used with such other optical materials.

The laser beam is collinear and grazes the optical fiber(s). This can be accomplished in many ways. For example, a 45-degree mirror with a central hole is used to redirect the laser beam collinear with the axis of the fiber(s) (the fiber(s) pass through the hole, parallel to each other). Other methods that direct the laser beam along the axis of the fiber(s) may also be employed; such methods are well-known to those skilled in this art. The laser beam itself can be (but not necessarily) annular in shape. This last requirement is accomplished by different techniques: scanning system, special optical components (axicon), $TEM_{01}$ laser mode, central obstruction, diffractive optical element, etc. The same effect could be accomplished by using two or more laser beams, all collinear with the optical fiber(s).

The optical components being fusion-spliced preferably have similar thermal and/or mechanical properties. However, this is not a necessary requirement, since dissimilar optical components can be fusion-spliced employing the teachings of the present invention. In such cases, the possibility of strain due to the process may cause the splice to break if the conditions are not right, and thus must be taken into account. However, such a consideration is well within the experience of the person skilled in this art, and no undue experimentation is required.

Figure 2:
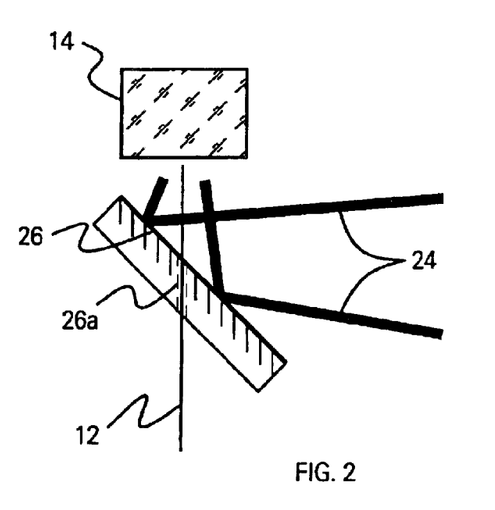
FIG. 2 is a side elevational view, showing schematically the apparatus employed in fusion-splicing one optical fiber to an optical element.
Figure 3:
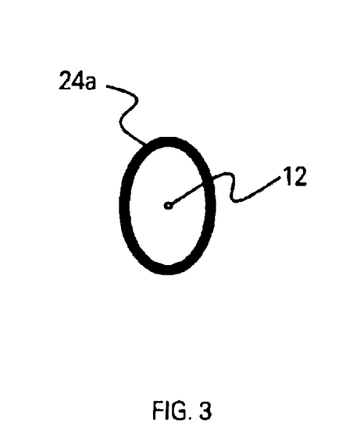
FIG. 3 is a view of an annular laser beam as it appears on the surface of a mirror through which the optical fiber is passed.
Figure 4:
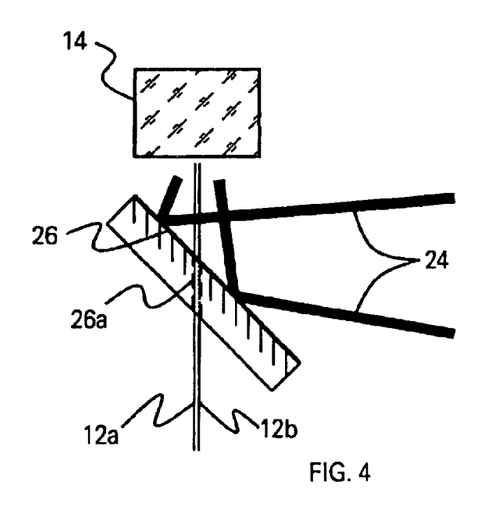
FIG. 4 is a side elevational view, similar to that of FIG. 2, showing the fusion-splicing of two optical fibers to an optical element.

FIG. 2 depicts the laser beam 24 impinging on the mirror 26, which has a hole 26a therethrough. One optical fiber 12 passes through the hole 26a in the mirror 26 and is fusion-spliced to the optical element, e.g., lens, 14. FIG. 2 depicts the optical fiber 12 just prior to fusion-splicing to the lens 14. FIG. 3 depicts an annular laser beam 24a in cross-section, along with the fiber 12. The optical element 14 may be a lens, filter, grating, prism, WDM device, or other such optical component to which it is desired to secure the optical fiber 12. FIG. 4 is a similar view depicting the fusion of two optical fibers 12a, 12b to the optical element 14. It will be appreciated that even more optical fibers may be fusion-spliced to the optical element 14, employing the teachings herein.

The technology disclosed herein can be applied to conventional fiber collimators, expanded beam collimators, WDM products, and any other device that has a glass or polymer attachment site. One is no longer limited to fusing components that only have substantially similar diameters.

As mentioned above, a key performance parameter to be minimized in collimator assemblies is back-reflection of light back down the fiber 12. By butt-coupling or fusion-splicing a fiber to a lens of the same refractive index, there is no apparent interface to cause back-reflection. In fusion-splicing a fiber to an optical element made of pure silica, the difference in refractive index of the two elements is so small that it is often neglected. However, this difference is not exactly zero because the core of the fiber has a slightly higher index than the bulk material. In fact, this difference in index is the basis for the guiding properties of the fiber. For typical single-mode step index fiber this difference is approximately 0.36% (from the product information sheet of the Corning® SMF-28™ CPC6 Single-mode Optical Fiber) and will cause a back-reflection from the interface of −57 dB (=10 log[Power reflected/Incident Power]). For most applications, this small amount of back-reflected power is negligible. But for some cases, it is detrimental. In those cases, a back-reflection of −65 dB is considered an acceptable performance.

Figure 5:
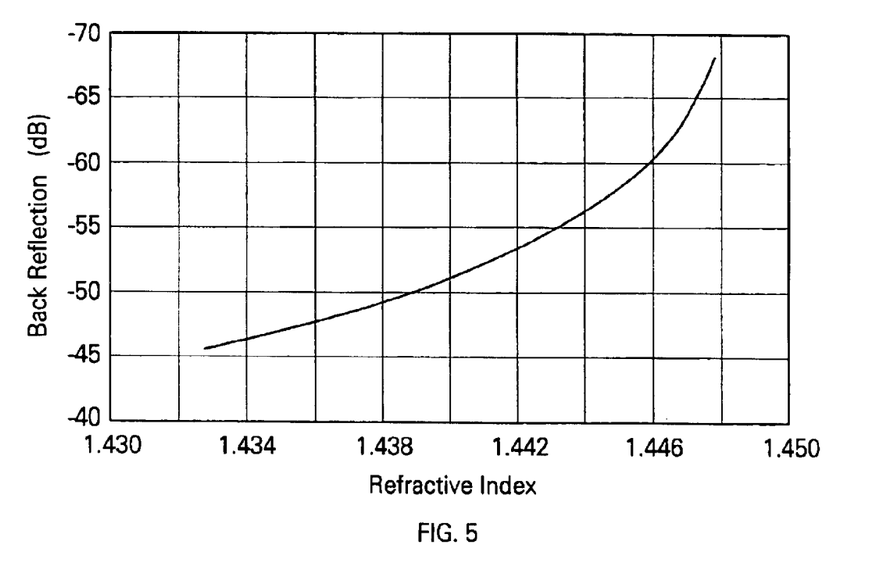
FIG. 5, on coordinates of back-reflection (in dB) and refractive index, is a plot of the calculated back-reflection from a fiber/pure-silica optical interface.

FIG. 5 illustrates the expected back-reflection from a fusion-spliced junction as a function of the refractive index of the optical element assuming the fiber is a single-mode step index fiber. The curves would be very similar for all other types of fibers.

Figure 6A:
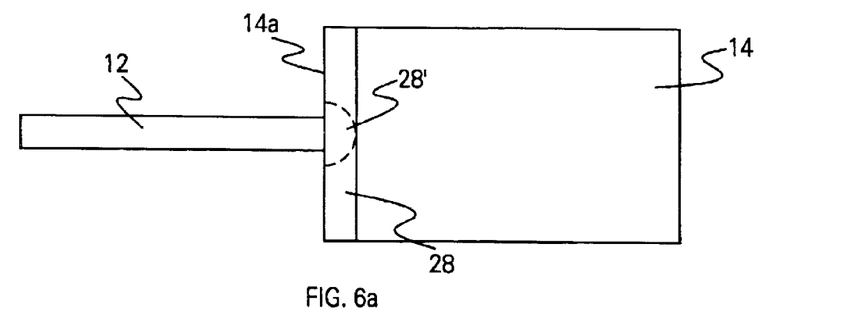
FIG. 6a is a side elevational, schematic diagram depicting an optical fiber fusion-spliced to an optical element with a gradient layer in the joining surface of the optical element.
Figure 6B:
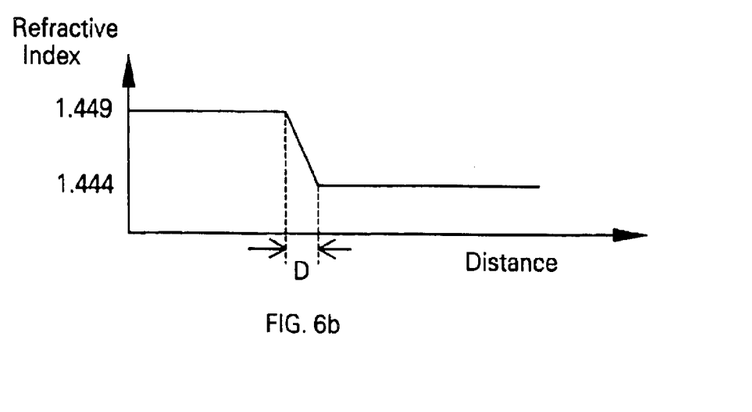
FIG. 6b, on coordinates of refractive index and distance, is a plot of the refractive index as a function of distance along the optical fiber, through the gradient layer, and into the optical element.

The refractive index of fused silica at 1.55 µm is 1.444. Using a material with a slightly higher index would bring the back-reflection down from −57 dB to −65 dB. However, silica remains the best material because its thermal properties are well-matched to those of the fiber. A better solution would be to create an intermediate layer 28 between the fiber 12 and the optical element 14. The refractive index of that intermediate layer 28 should vary gradually as illustrated in FIG. 6a and 6b. The exact profile of the index function is not critical. The intermediate layer 28 is formed in the surface 14a of the optical element 14, and extends a short distance D thereinto. The intermediate layer 28 may instead comprise a region 28', shown in phantom, that is formed in the immediate vicinity of the fusion-spliced fiber 12.

Such a gradient reduces the back-reflection of the interface. For a linear gradient of thickness D, the calculated back-reflection is illustrated in FIG. 7.

Figure 7:
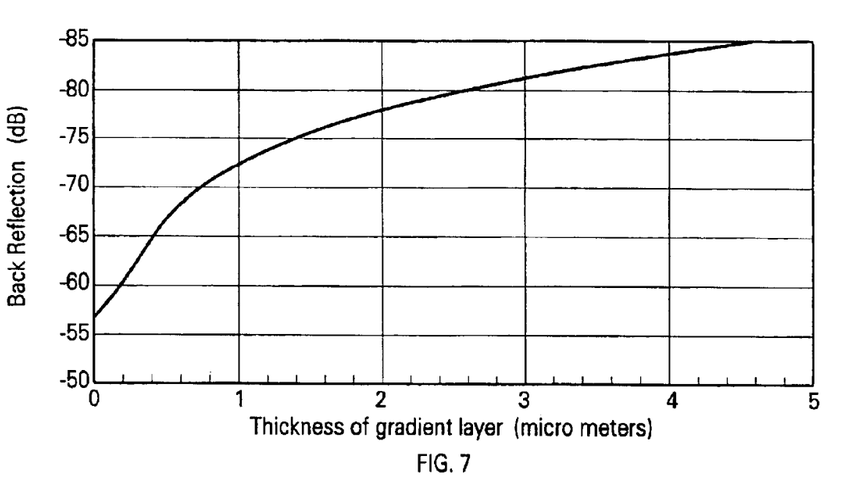
FIG. 7, on coordinates of back-reflection (in dB) and thickness of the gradient layer, is a plot depicting the impact of an axial gradient layer on the back-reflection of a fusion-splice.

It can be seen from FIG. 7 that even a very thin gradient layer (<2 µm) considerably improves the back-reflection of the fusion-splice. Because the index profile and the thickness are non-critical parameters, the gradient layer 26 can be easily incorporated in the fusion-splice process. To be effective, the gradient needs to be at least 0.2 µm in thickness. The thicker the gradient, the better the result. However, above a thickness of 2 µm, the incremental reduction in back-reflection is negligible.

Figure 8:
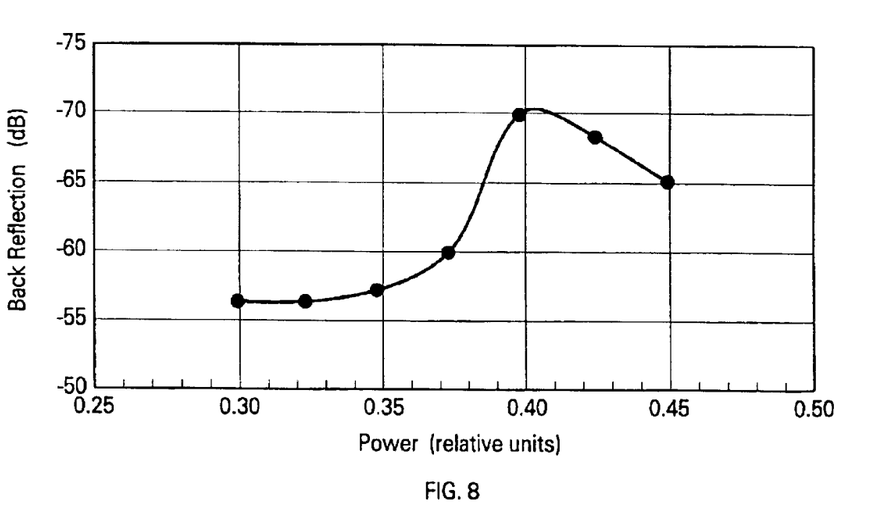
FIG. 8, on coordinates of back-reflection (in dB) and power (in relative units), is a plot illustrating how a thin gradient layer can be created and subsequently the back-reflection can be improved by adjusting the laser power used for fusion splicing.

Different approaches to forming the gradient layer 28 are possible. The first and most straightforward technique is to promote diffusion of the fiber core dopant(s) during the fusion-splice process. In the particular case of single mode step index fiber 12, the core of the fiber is doped with a small concentration of germanium (Ge) to increase the refractive index. During the fusion-splicing process, a thin layer of glass at the tip of the fiber reaches a very high temperature and melts, allowing the Ge-doped glass to spread and the Ge to diffuse. Various combinations of process parameters (laser power, exposure time, junction pressure, post-heating, etc.) can be used to induce this thin gradient layer 28. For example, FIG. 8 illustrates the impact of laser power on the measured back-reflection.

In this particular case, a fusion-splice is obtained by placing the fiber tip in contact with the back surface of the lens and by applying laser power in the fashion described in the present application. At the low end of the laser power scale, enough heat is generated to melt the surface and/or fiber tip, and perfect optical contact between the fiber and the back surface of the lens is achieved. This results in a back reflection on the order of −57 dB, consistent with the difference between the refractive index of the fiber core and fused silica. As the power level is increased, there comes a point where the germanium in the core of the fiber diffuses or separates in a thin layer at the junction. This layer acts as a refractive index gradient, reducing the back reflection to values below −65 dB.

The same overall results can be obtained by creating a thin axial gradient layer 28 on the surface 14a of the optical element 14 prior to fusion-splicing. The obvious approach is to diffuse Ge, since this is the dopant used to increase the index of the fiber core. One possible technique is to deposit a solution of germanium oxide on the surface and use a $CO_2$ laser to incorporate the Ge within a thin surface layer of melted glass. Other in-diffusion, ion-implantation or ion migration techniques are also possible.

Thus, it will be appreciated that the gradient layer 28 is formed in at least a portion of the surface 14*a* of the optical element 14, either directly associated with the optical fiber(s) 12 and, possibly, the immediate vicinity, or across the entire surface.

The fiber collimators prepared in accordance with the teachings of the present invention have high power handling ability. Power levels in excess of 9 Watts have been reached without any indication of damage. This represents a factor of ten increase over the power of prior art fiber collimators, such as that depicted in FIG. 1*a*.

Fiber collimators produced using prior art methods are typically limited to less than 1 watt continuous laser power throughput. Most have specified power handling limits of 300 milliwatts. The failure mechanism of prior art collimators is typically catastrophic damage induced by the high laser intensity on the anti-reflection coated fiber facet. Due to the very small central guiding region of single mode optical fibers (10 micrometers in diameter is typical), very high intensity levels are reached (approximately 1 megawatt/$cm^2$) at 1 watt throughput power levels. It is well-known that this intensity level often induces catastrophic failure at optical surfaces.

However, by fusing the fiber directing to an optical element, such as a pure silica collimator lens or plano-plano pellet, the fiber facet has been effectively eliminated. The air-glass interface has been moved to the output face of the attached optical element, where it has expanded to a typical diameter of 500 micrometers. The intensity at 1 watt laser power throughput is only 500 watts/$cm^2$ at the output facet of the optical element, representing a decrease in intensity of 2,500 times. Therefore, the power handling capacity of collimators produced in accordance with the teachings of the present invention is many times higher than that of prior art collimators. Potential applications exist in the areas of laser transmitters, high pump power fiber amplifiers, fiber lasers, laser projection displays, laser velicometers, medical laser delivery systems, and industrial laser delivery systems.

Figure 9:
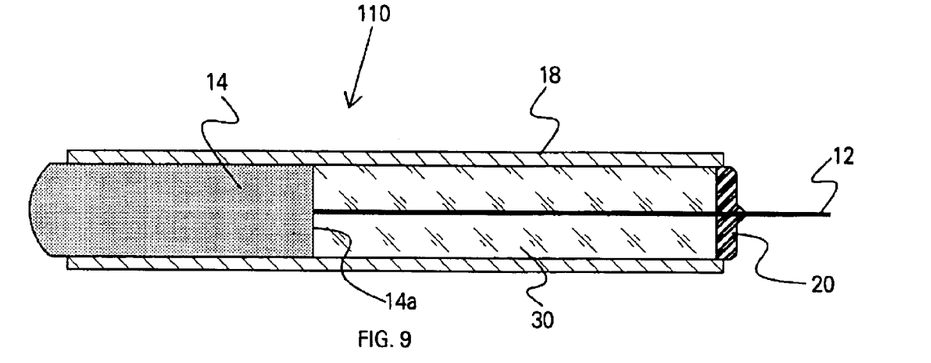
FIG. 9 is a cross-sectional view of a collimator of the present invention comprising a fiber fusion-spliced to a collimator lens.
Figure 10:
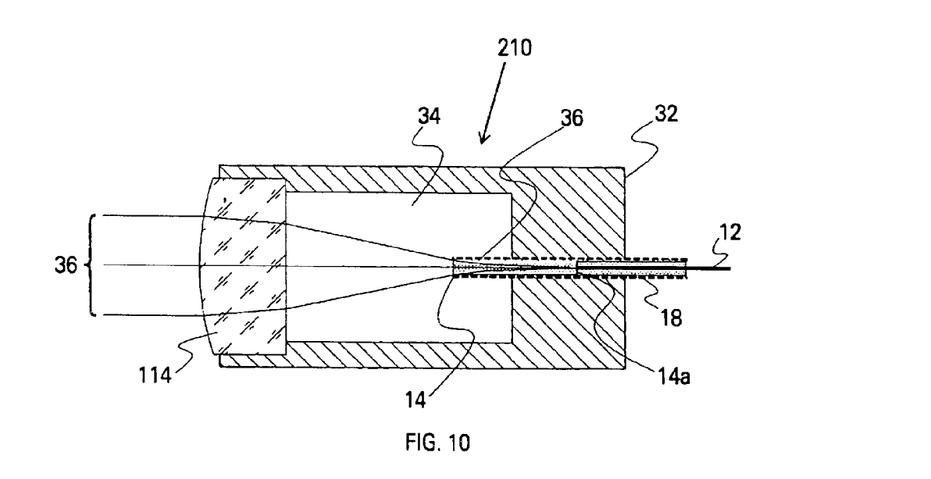
FIG. 10 is a cross-sectional view of a collimator of the present invention comprising a fiber fusion-spliced to a plano-plano optical element ("pellet"), assembled in combination with a separate collimator lens.

FIGS. 9 and 10 are each a cross-sectional view of two preferred embodiments of the fiber collimator of the present invention. In FIG. 9, the fiber collimator 110 comprises the fiber 12 fusion-spliced to the lens 14, both contained in the mounting sleeve 18. A glass stabilizer tube 30 supports the fiber 12 and the elastomer 20 provides strain relief. As an example, the mounting sleeve 18 comprises 300 series stainless steel, provided with a 3 micron thick Cu—Ni—Au plating. Alternatively, the lens 14 and the glass stabilizer tube 30 may be provided with a metal coating in place of the mounting sleeve 18. The typical diameter of the collimated beam is on the order of 0.5 millimeters.

In FIG. 10, the fiber collimator 210 comprises the fiber 12 fusion-spliced to the optical element 14, here a plano-plano pellet, both contained in the mounting sleeve 18. The mounting sleeve 18 is secured in a housing 32 which includes a chamber 34. The mounting sleeve 18 protrudes into one end of the chamber 34 a distance. At the opposite end of the chamber 34 is a separate collimator lens 114. The plano-plano pellet 14 comprises a glass rod provided with plano-plano entrance and exit surfaces. A beam 36 emerging from the fiber 12 diverges in the pellet 14, which serves to minimize back-reflection; the pellet does not collimate the beam. Instead, the diverging beam 36 is collimated by the separate collimator lens 114. This configuration permits a much larger collimated beam, anywhere from 1 to 80 mm, and even larger. Such a large collimated beam, without the configuration depicted in FIG. 10, would ordinarily require considerably more glass. Thus, the configuration depicted in FIG. 10 saves glass and its concomitant weight. Of course, the beam 36 could be incident on the separate collimator lens 114 and converge onto the optical fiber 12.

INDUSTRIAL APPLICABILITY

The method of the invention is expected to find use in the fabrication of fiber collimators, employing fusion-splicing of at least one optical fiber to an optical element having a relatively larger cross-sectional area.

Thus, there has been disclosed a fiber collimator, comprising at least one optical fiber fusion-spliced to an optical element, such as a collimator lens, which includes a gradient in refractive index in the joining surface thereof, and a method for the fabrication thereof. It will be readily apparent to those skilled in this art that various changes and modifications of an obvious nature may be made, and all such changes and modifications are considered to fall within the scope of the present invention, as defined by the appended claims.

What is claimed is:

1. A method of increasing power handling capacity and improving pointing accuracy in a fiber collimator comprising an optical element and at least one optical fiber secured to a portion of a surface thereof, said method comprising:

(a) forming an axial gradient in index of refraction in at least said portion of said surface of said optical element; and (b) fusion-splicing said at least one optical fiber to said portion of said surface of said optical element, said fusion-splicing being performed by directing a laser beam alone said at least one optical fiber and collinear therewith, such that said laser beam strikes said surface of said optical element at normal or near normal incidence.

2. The method of claim 1 wherein said optical element is selected from the group consisting of lenses, filters, gratings, prisms, and wavelength division multiplexer devices.

3. The method of claim 2 wherein said optical element is a collimating lens.

4. The method of claim 1 wherein said gradient in said surface of said optical element is formed during said fusion-splicing.

5. The method of claim 1 wherein said gradient in said surface of said optical element is formed prior to said fusion-splicing.

6. The method of claim 5 wherein said optical fiber comprises a core surrounded by a cladding, said core being doped with at least one dopant and wherein said surface of said optical element is first coated with said at least one dopant and said at least one dopant is diffused into said surface.

7. The method of claim 1 wherein said gradient is formed to a thickness of at least 0.2 $\mu$m.

8. The method of claim 7 wherein said thickness is less than about 2 $\mu$m.

9. The method of claim 1 wherein said optical element is a collimating lens having a surface to which said at least one optical fiber is attached that is normal to said at least one optical fiber.

10. The method of claim 9 wherein said collimating lens and said at least one optical fiber are secured in a mounting sleeve following said fusion-splicing.

11. The method of claim 1 wherein said optical element is a plano-plano pellet having a surface to which said at least one optical fiber is attached that is normal to said at least one optical fiber.

12. The method of claim 11 wherein said plano-plano pellet and said at least one optical fiber are secured in a mounting sleeve following said fusion-splicing, said mounting sleeve in turn secured in a housing provided with a chamber, said mounting sleeve located at one end of said chamber and a collimating lens located at an opposite end of said chamber.

13. A method of increasing power handling capacity and improving pointing accuracy in a fiber collimator comprising an optical element and at least one optical fiber secured to a portion of a surface thereof, said method comprising:

(a) forming an axial gradient in index of refraction in at least said portion of said surface of said optical element, said axial gradient formed to a thickness of at least 0.2 $\mu$m and less than about 2 $\mu$m; and (b) fusion-splicing said at least one optical fiber to said portion of said surface of said optical element, said fusion-splicing being performed by directing a laser beam along said at least one optical fiber and collinear therewith, such that said laser beam strikes said surface of said optical element at normal or near normal incidence.

14. The method of claim 13 wherein said optical element is selected from the group consisting of lenses, filters, gratings, prisms, and wavelength division multiplexer devices.

15. The method of claim 14 wherein said optical element is a collimating lens.

16. The method of claims 13 wherein said gradient in said surface of said optical element is formed during said fusion-splicing.

17. The method of claim 13 wherein said gradient in said surface of said optical element is formed prior to said fusion-splicing.

18. The method of claim 17 wherein said optical fiber comprises a core surrounded by a cladding, said core being doped with at least one dopant and wherein said surface of said optical element is first coated with said at least one dopant and said at least one dopant is diffused into said surface.

19. The method of claim 13 wherein said optical element is a collimating lens having a surface to which said at least one optical fiber is attached that is normal to said at least one optical fiber.

20. The method of claim 19 wherein said collimating lens and said at least one optical fiber are secured in a mourning sleeve following said fusion-splicing.

21. The method of claim 13 wherein said optical element is a plano-plano pellet having a surface to which said at least one optical fiber is attached that is normal to said at least one optical fiber.

22. The method of claim 21 wherein said plano-plano pellet and said at least one optical fiber are secured in a mounting sleeve following said fusion-splicing, said mounting sleeve in turn secured in a housing provided with a chamber, said mounting sleeve located at one end of said chamber and a collimating lens located at an opposite end of said chamber.

* * * * *